US009632751B2

(12) United States Patent
Ban (10) Patent No.: US 9,632,751 B2
(45) Date of Patent: Apr. 25, 2017

(54) ARITHMETIC CIRCUIT AND ARITHMETIC METHOD

(71) Applicant: KABUSHIKI KAISHA TOSHIBA, Minato-ku, Tokyo (JP)

(72) Inventor: Koichiro Ban, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 405 days.

(21) Appl. No.: 14/140,384

(22) Filed: Dec. 24, 2013

(65) Prior Publication Data

US 2014/0181170 A1    Jun. 26, 2014

(30) Foreign Application Priority Data

Dec. 26, 2012    (JP) ................................. 2012-282775

(51) Int. Cl.
*G06F 7/506* (2006.01)
*G06F 7/53* (2006.01)
*G06F 7/499* (2006.01)

(52) U.S. Cl.
CPC ...... *G06F 7/49963* (2013.01); *G06F 7/49952* (2013.01); *G06F 7/506* (2013.01); *G06F 7/5312* (2013.01)

(58) Field of Classification Search
None
See application file for complete search history.

(56) References Cited

U.S. PATENT DOCUMENTS

| 5,257,217 | A | * | 10/1993 | Chiu | ..................... | G06F 7/5324 |
| | | | | | | 708/629 |
| 5,627,774 | A | * | 5/1997 | Schwarz | ................. | G06F 5/012 |
| | | | | | | 708/205 |
| 5,771,183 | A | * | 6/1998 | Makineni | ................ | G06F 5/012 |
| | | | | | | 708/205 |
| 6,148,314 | A | * | 11/2000 | Matheny | ................. | G06F 7/485 |
| | | | | | | 708/497 |
| 6,898,614 | B2 | * | 5/2005 | Birru | .................... | G06F 7/49947 |
| | | | | | | 708/497 |
| 7,948,267 | B1 | * | 5/2011 | Mauer | ................. | G06F 7/49947 |
| | | | | | | 326/38 |
| 2007/0130242 | A1 | * | 6/2007 | Tajiri | ...................... | G06F 5/012 |
| | | | | | | 708/525 |

FOREIGN PATENT DOCUMENTS

JP    6-348455 A    12/1994

OTHER PUBLICATIONS

Patterson, D. and Hennessy, J., "Computer Organization and Design: The Hardware/Software Interface", 3rd Edition, 2005, pp. 368-454.*

* cited by examiner

*Primary Examiner* — Matthew Sandifer
(74) *Attorney, Agent, or Firm* — Holtz, Holtz & Volek PC (57) ABSTRACT

According to one embodiment, an arithmetic circuit includes follows. The arithmetic unit performs an arithmetic operation including addition and multiplication to generate a first value of (n+m) bits. The rounding preprocessor performs an OR operation on lower (m−k) bits of the first value to generate a second value of 1 bit. The register stores a third value of (n+k+1) bits obtained by concatenating upper (n+k) bits of the first value and the second value. The rounding postprocessor calculates a carry bit value of 1 bit from a most significant bit of the third value and lower (k+1) bits of the third value, and adds the carry bit value to upper n bits of the third value.

1 Claim, 11 Drawing Sheets

| | a[3] | a[2] | a[1] | a[0] |
|---|---|---|---|---|
| × | b[3] | b[2] | b[1] | b[0] |
| + | c[3] | c[2] | c[1] | c[0] |

Partial products:

| | | | | | | | | |
|---|---|---|---|---|---|---|---|---|
| | ~c[3] | ~c[3] | ~c[3] | ~c[3] | ~c[3] | c[2] | c[1] | c[0] |
| + | | | | 1 | ~d0[3] | d0[2] | d0[1] | d0[0] |
| + | | | | ~d1[3] | d1[2] | d1[1] | d1[0] | |
| + | | | ~d2[3] | d2[2] | d2[1] | d2[0] | | |
| + | 1 | d3[3] | ~d3[2] | ~d3[1] | ~d3[0] | | | |

| x[7] | x[6] | x[5] | x[4] | x[3] | x[2] | x[1] | x[0] |
|---|---|---|---|---|---|---|---|

ARITHMETIC CIRCUIT AND ARITHMETIC METHOD

CROSS REFERENCE TO RELATED APPLICATIONS

This application is based upon and claims the benefit of priority from Japanese Patent Application No. 2012-282775, filed Dec. 26, 2012, the entire contents of which are incorporated herein by reference.

FIELD

Embodiments described herein relate generally to an arithmetic circuit and arithmetic method.

BACKGROUND

There is an arithmetic circuit that performs a multiplication process and rounding process. This arithmetic circuit determines an addition value in accordance with positive/negative of a multiplication result, adds the addition value to the multiplication result, and rounds down lower bits. Since this arithmetic circuit performs the arithmetic processing and rounding process together, the processing delay increases when compared to the performance of the arithmetic processing alone.

DETAILED DESCRIPTION

According to one embodiment, an arithmetic circuit includes an arithmetic unit, a rounding preprocessor, a register, and a rounding postprocessor. The arithmetic unit is configured to perform an arithmetic operation including addition and multiplication to generate a first value of (n+m) bits, where n is an integer of not less than 1 and m is an integer of not less than 2. The rounding preprocessor is configured to perform an OR operation on lower (m−k) bits of the first value to generate a second value of 1 bit, where k is an integer of not less than 1 and not more than (m−1). The register stores a third value of (n+k+1) bits obtained by concatenating upper (n+k) bits of the first value and the second value. The rounding postprocessor is configured to calculate a carry bit value of 1 bit from a most significant bit of the third value and lower (k+1) bits of the third value, and add the carry bit value to upper n bits of the third value.

Hereinafter, arithmetic circuits and arithmetic methods according to embodiments will be described with reference to the accompanying drawings.

The embodiments will be explained by using a bit description method complying with the Verilog HDL language. For example, an n-bit value (i.e., a value of n bits) x is defined by $x[n-1:0]=\{x[n-1], x[n-2], \ldots, x[0]\}$ as an n-bit vector having $x[n-1]$ as the most significant bit (MSB) and $x[0]$ as the least significant bit (LSB). When expressing all bits of the value x, [n−1:0] can be omitted. A specific bit range of the value x can be designated by, e.g., x[a:b]. An example is $x[4:2]=\{x[4], x[3], x[2]\}$. An (n+m)-bit value c obtained by concatenating an n-bit value a and an m-bit value b can be represented by $c=\{a,b\}$. A numerical value of a plurality of bits basically means a signed integer by two's complement expression.

Figure 1:
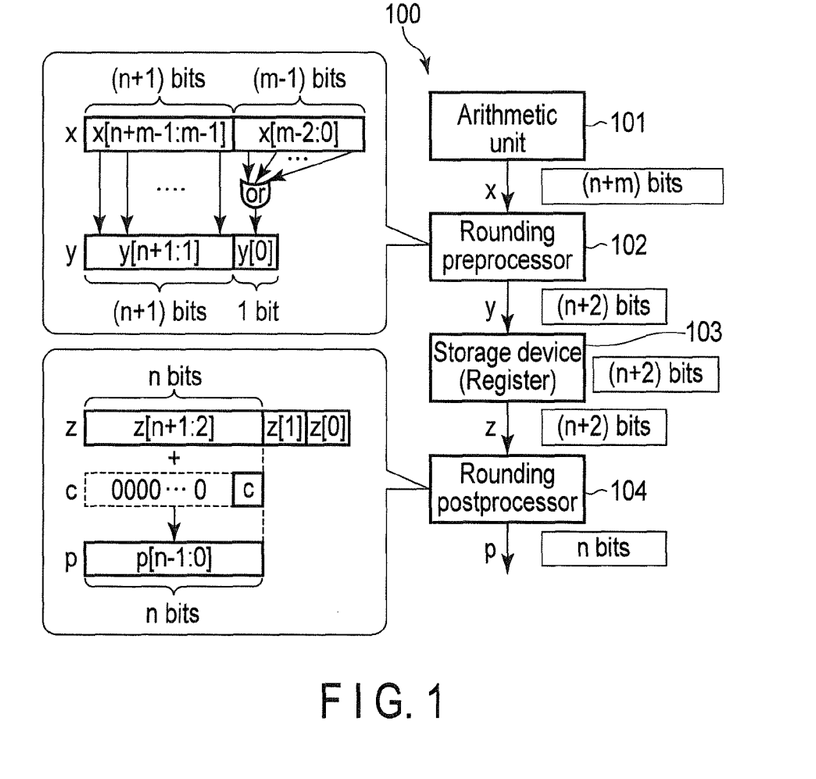
FIG. 1 is a block diagram schematically showing an arithmetic circuit according to the first embodiment.

FIG. 1 schematically shows an arithmetic circuit 100 according to the first embodiment. The arithmetic circuit 100 is a pipelined rounding arithmetic circuit. Specifically, the arithmetic circuit 100 includes an arithmetic unit 101, a rounding preprocessor 102, a register 103 as a storage device, and a rounding postprocessor 104, as shown in FIG. 1. In the present embodiment, a rounding process for output data from the arithmetic unit 101 is performed in two stages (i.e., rounding preprocessing and rounding postprocessing), i.e., performed by the rounding preprocessor 102 and rounding postprocessor 104 arranged with the register 103 being sandwiched between them. The rounding preprocessor 102 compresses the number of bits of the output data from the arithmetic unit 101, and can operate in parallel with the arithmetic unit 101. By providing the rounding preprocessor 102, it is possible to reduce the number of bits of the register 103 while satisfying a required operation speed.

The arithmetic unit 101 performs addition, multiplication, and an arithmetic operation combining addition and multiplication. The arithmetic operation performed by the arithmetic unit 101 includes an arithmetic operation represented by AB+CD such as complex multiplication, where A, B, C, and D are integers. The arithmetic unit 101 outputs an (n+m)-bit calculation value x as the operation result, where n is an integer of not less than 1 and m is an integer of not less than 2.

The rounding preprocessor 102 generates a 1-bit calculation value by performing an OR operation on lower (m−1) bits of the value x, and outputs an (n+2)-bit value y by concatenating the generated value to upper (n+1) bits of the value x. For example, the rounding preprocessor 102 generates the (n+2)-bit value y as indicated by:

$$y = \left\{ x[n+m-1:m-1], \overline{x[m-2]|x[m-1]| \ldots |x[0]} \right\} \quad (1)$$

The LSB y[0] of the value y is a calculation value generated by the rounding preprocessor 102. The LSB y[0] is 0 when all the lower (m−1) bits of the value x are 0s, and 1 when at least one of the lower (m−1) bits of the value x is 1. The register 103 stores the output y from the rounding preprocessor 102. The register 103 shown in FIG. 1 is an (n+2)-bit register. The value y held in the register 103 is supplied as a value z to the rounding postprocessor 104.

The rounding postprocessor 104 performs rounding post-processing on the (n+2)-bit value z held in the register 103 to generate an n-bit value p which is rounded. For example, the rounding postprocessor 104 calculates a 1-bit carry bit value c from the MSB (i.e., the sign bit) of the value z and lower two bits of the value z, and adds the carry bit value c to upper n bits of the value z, as indicated by:

$$p = z[n+1:2] + c \quad (2)$$

$$c = (\sim z[n+1] \& z[1]) | (z[n+1] \& z[1] \& z[0]) \quad (3)$$

where c represents the carry bit value, "~" represents logical NOT operator (i.e., bit inversion), "&" represents logical AND operator, and "|" represents logical OR operator.

In equation (2), a carry occurs when z[n+1:2] as the upper n bits of the value z is a positive maximum value by two's complement expression (i.e., z[n+1:2]={0, 1, 1, ..., 1} and the carry bit value c is 1. Therefore, (n+1) bits are necessary to correctly express the output p. To output the output p as an n-bit value when there is the possibility that z[n+1:2] is a positive maximum value by two's complement expression, the rounding postprocessor 104 can calculate the carry bit value c by using equation (4) below, instead of equation (3). Equation (4) is obtained by adding overflow determination to equation (3), i.e., obtained by correcting equation (3) such that the carry bit value c is 0 when z[n+1:2]={0, 1, 1, ..., 1}:

$$c = (\sim z[n+1] \& z[1] \& (z[n:2]! = \{1,1, \ldots, 1\})) | (z[n+1] \& z[1] \& z[0]) \quad (4)$$

Figure 16:
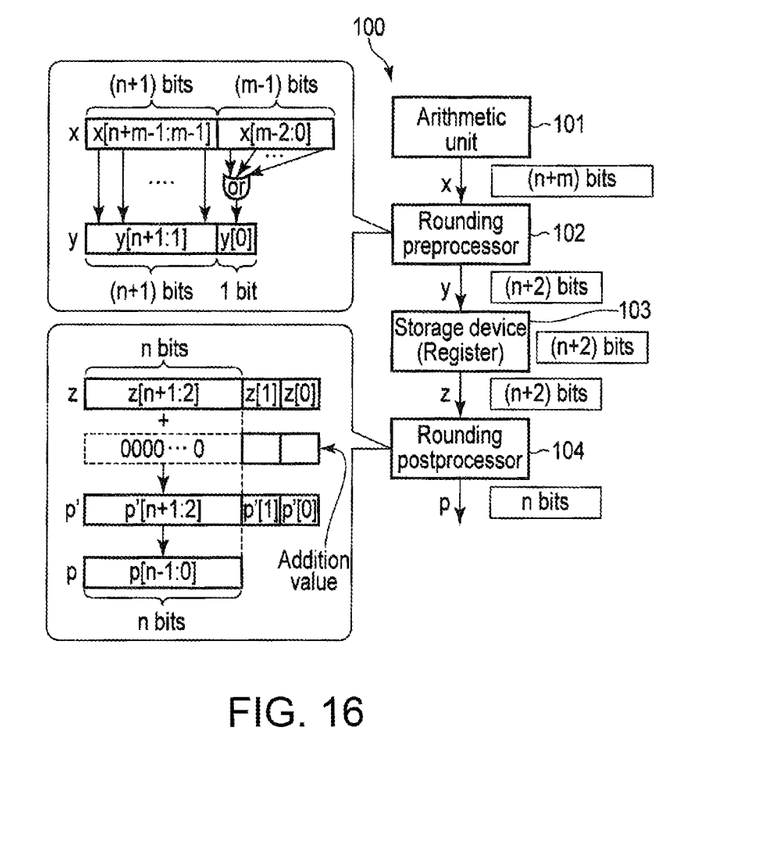
FIG. 16 is a block diagram schematically showing an arithmetic circuit according to a modification of the first embodiment.

A calculation equivalent to the combination of equation (2) and equation (3) (or equation (4)) is, e.g., a method of adding an addition value for rounding (more specifically, round-off) to the value z, and extracting upper n bits of a resulting value p'. In this method, shown in FIG. 16, it is unnecessary to directly calculate the carry bit value. In this method, the calculation combining equations (2) and (3) can be represented by:

$$p' = \begin{cases} z + \{1, 0\} & (z[n+1] = 0) \\ z + \{0, 1\} & (z[n+1] = 1) \end{cases} \quad (5)$$

$$p = p'[n+1:2]$$

Referring to FIG. 1, the circuit configuration is illustrated such that the arithmetic unit 101 and rounding preprocessor 102 operate in turn. In an actual circuit configuration, however, at least a part of the processing of the rounding preprocessor 102 is performed in parallel with a part of the processing of the arithmetic unit 101 as will be described later. More specifically, the rounding preprocessor 102 can start the process of compressing the number of bits of the output data from the arithmetic unit 101, before all bits are determined in the arithmetic unit 101. In particular, the processing of the rounding preprocessor 102 can be completed before the processing of the arithmetic unit 101 is completed. In this case, the processing of the rounding preprocessor 102 can be added without decreasing the operation speed of the arithmetic unit 101 at all. In the present embodiment, a part (i.e., rounding preprocessing) of the rounding process is performed in parallel with the processing of the arithmetic unit 101, so the rounding process can be performed faster. In addition, since the rounding preprocessor 102 compresses the number of bits of the output data from the arithmetic unit 101, the number of bits of the register 103 installed when the circuit is pipelined can be reduced. As a consequence, the circuit scale can be reduced. Accordingly, the rounding preprocessor 102 makes it possible to reduce the circuit scale while maintaining or increasing the operation speed. The operations of the arithmetic unit 101 and rounding preprocessor 102 will be explained in detail later.

Note that the output x from the arithmetic unit 101 is supplied to the rounding preprocessor 102 in FIG. 1, but the upper (n+1) bits of the output x may also directly be provided to the register 103.

Figure 2A:
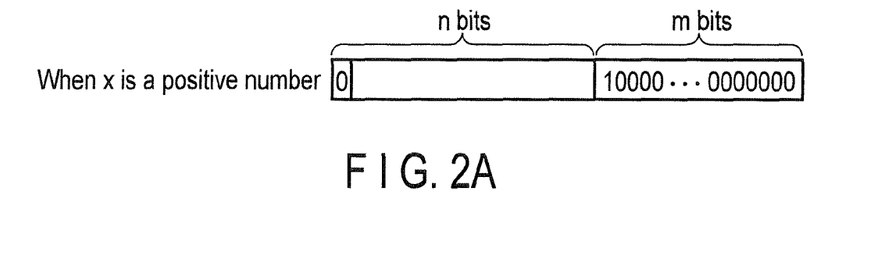
FIGS. 2A and 2B are views for explaining round-off calculations.
Figure 2B:
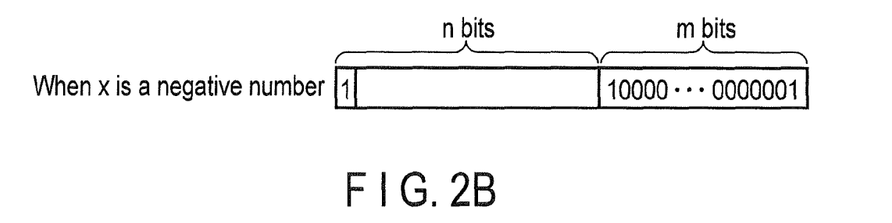

FIG. 2A shows an example of a bit configuration when the value (e.g., the output from the arithmetic unit 101) x is a positive number. FIG. 2B shows an example of a bit configuration when the value x is a negative number. Referring to FIGS. 2A and 2B, the MSB (i.e., the (n+m−1)th bit) of the value x represents a sign bit, bits from the (n+m−2)th bit to the mth bit represent an integer part, and bits from the (m−1)th bit to the 0th bit (i.e., lower m bits) represent a decimal part. The MSB is 0 when the value x is a positive number, and 1 when the value x is a negative number.

When the output x from the arithmetic unit 101 is a positive number, as shown in FIG. 2A, a condition for incrementing the upper n bits of the output x by round-off is that the lower m bits of the output x are {1, 0, 0, ..., 0} or more (i.e., $2^{m-1}$ or more). On the other hand, when the output x from the arithmetic unit 101 is a negative number, as shown in FIG. 2B, a condition for incrementing the upper n bits of the output x by round-off is that the lower m bits of the output x are {1, 0, 0, ..., 1} or more (i.e., $2^{m-1}+1$ or more). In the arithmetic circuit 100, the rounding preprocessor 102 compresses the lower (m−1) bits of the output x by an OR operation, the register 103 holds the compressed value, and the rounding postprocessor 104 performs a round-off calculation based on the value held in the register 103 and in accordance with the plus or minus sign of the value.

Figure 3:
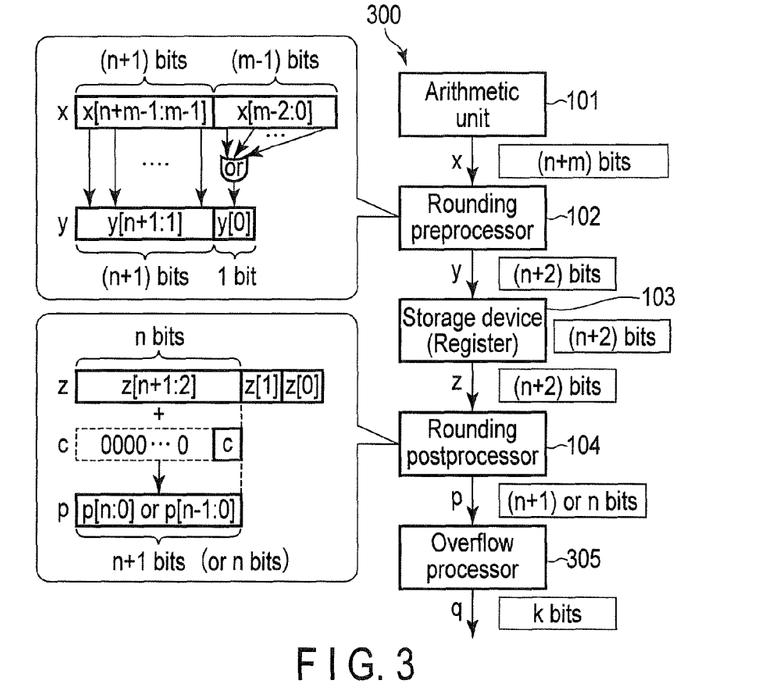
FIG. 3 is a block diagram schematically showing an arithmetic circuit according to the second embodiment.

FIG. 3 schematically shows an arithmetic circuit 300 according to the second embodiment. The difference between the arithmetic circuit 300 shown in FIG. 3 and the arithmetic circuit 100 shown in FIG. 1 is the number of bits of the final output. The number of bits of the final output from the arithmetic circuit 300 is j, where j is an integer satisfying 0<j<n. More specifically, the arithmetic circuit 300 shown in FIG. 3 is obtained by adding an overflow processor 305 for performing overflow processing to the arithmetic circuit 100 shown in FIG. 1. The overflow processor 305 is installed subsequent to a rounding postprocessor 104.

In the arithmetic circuit 300, the arrangements and operations up to the rounding postprocessor 104 are basically the same as those of the arithmetic circuit 100. However, overflow determination as indicated by equation (4) is unnecessary because the overflow processor 305 absorbs this determination, and the rounding postprocessor 104 performs rounding postprocessing in accordance with equations (2) and (3) and outputs a rounded value p. The number of digits of the value of the output p from the rounding postprocessor 104 is n+1 in some cases depending on an arithmetic operation performed in an arithmetic unit 101. In the present embodiment, the number of digits of the output p is processed as (n+1) bits. As described previously, however, n is guaranteed as the number of digits depending on the arithmetic operation of the arithmetic unit 101. If this is the case, p need only be processed as n bits.

The overflow processor 305 performs an overflow calculation for limiting the (n+1)-bit value p to j bits. For example, this overflow calculation is performed as:

$$q = \begin{cases} \{0, 1, 1 \ldots 1, 1\} & \text{if} \sim p[n] \ \& \ (p[n-1:0] \geq 2^k) \\ \{1, 0, 0, \ldots, 0, 1\} & \text{if} \ p[n] \ \& \ (p[n-1:0] \leq 2^k) \\ p[k-1:0] & \text{otherwise} \end{cases} \quad (6)$$

Equation (6) is equivalent to equation (7) below when regarding value p as a signed integer:

$$q = \begin{cases} 2^k - 1 & \text{if} \ p \geq 2^k \\ -(2^k - 1) & \text{if} \ p \leq -2^k \\ p & \text{otherwise} \end{cases} \quad (7)$$

Equations (6) and (7) are defined such that the positive and negative ranges are symmetrical, but equation (8) below may also be used instead of equation (6). In this case, the number of defined negative numbers becomes larger by one:

$$q = \begin{cases} \{0, 1, 1 \ldots 1, 1\} & \text{if} \sim p[n] \ \& \ (p[n-1:0] \geq 2^k) \\ \{1, 0, 0, \ldots, 0, 0\} & \text{if} \ p[n] \ \& \ (p[n-1:0] \leq 2^k) \\ p[k-1:0] & \text{otherwise} \end{cases} \quad (8)$$

Figure 4:
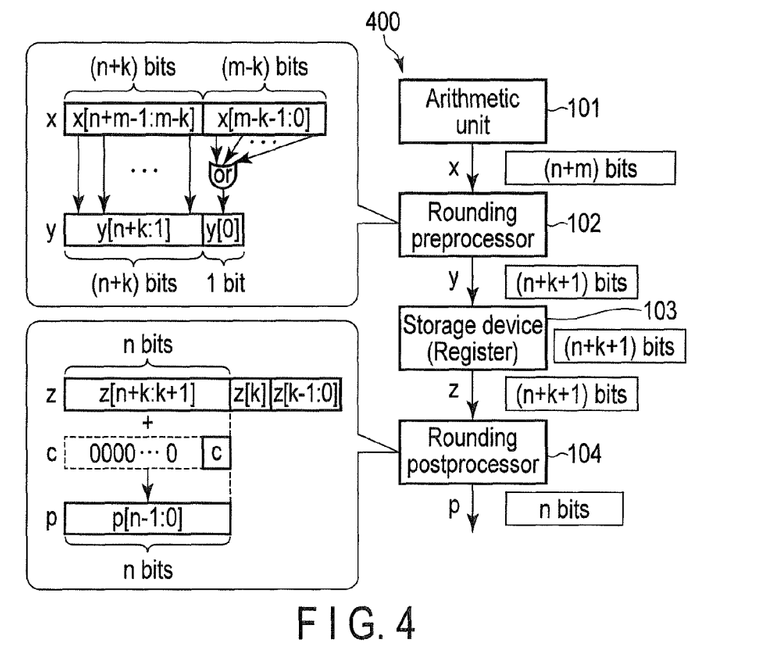
FIG. 4 is a block diagram schematically showing an arithmetic circuit according to the third embodiment.

FIG. 4 schematically shows an arithmetic circuit 400 according to the third embodiment. On a block diagram level, the only difference between the arithmetic circuit 400 shown in FIG. 4 and the arithmetic circuit 100 shown in FIG. 1 is the bit width. In the arithmetic circuit 400, the bit width of a rounding preprocessor 102 is changed, and the operation of a rounding postprocessor 104 is changed accordingly. However, the final output from the arithmetic circuit 400 is equal to the value obtained by the arithmetic circuit 100. In the arithmetic circuit 400, a bit width by which the rounding preprocessor 102 performs an OR operation is (m−k) bits. k is an integer satisfying 0<k<m−1. If k=1, the arithmetic circuit 400 is equivalent to the arithmetic circuit 100. Accordingly, the arithmetic circuit 400 of the third embodiment can be regarded as generalization of the arithmetic circuit 100 of the first embodiment.

The parameter k for defining the bit width of the rounding preprocessor 102 is determined in accordance with the circuit configuration. Depending on the circuit configuration, a processing delay generated by the processing of the rounding preprocessor 102 decreases the operation speed of the arithmetic circuit 400. To prevent the decrease in operation speed, it is necessary to decrease the bit width of the rounding preprocessor 102 by setting the parameter k to a large value. As will be described later, however, the processing of the rounding preprocessor 102 generates no processing delay in many cases, so the parameter k can be set to 1 in these cases. That is, the arithmetic circuit 100 of the first embodiment can be used.

The arithmetic circuit 400 uses, for example, equations (9) to (12) below instead of equations (1) to (4), respectively. More specifically, in accordance with equation (9), the rounding preprocessor 102 generates a 1-bit calculation value by performing an OR operation on lower (m−k) bits of an output x from an arithmetic unit 101, and outputs an (n+k+1)-bit value y by concatenating the generated calculation value to upper (n+k) bits of the value x. In the arithmetic circuit 400 shown in FIG. 4, the output y from the rounding preprocessor 102 is (n+k+1)-bit value, so a register 103 is an (n+k+1)-bit register. As the parameter k increases, a register having a larger number of bits becomes necessary. To downsize the circuit scale, the parameter k is preferably smaller. That is, the bit width by which the rounding preprocessor 102 performs an OR operation is preferably larger. As indicated by equations (10) and (11) below, the rounding postprocessor 104 calculates a carry bit value c from the MSB (i.e., the sign bit) of a value z held in the register 103 and lower (k+1) bits of the value z, and adds the carry bit value c to upper n bits z[n+k:k+1] of the value z. If there is the possibility that z[n+k:k+1] is a positive maximum value by two's complement expression, the rounding postprocessor 104 calculates the carry bit c by using equation (12) below instead of equation (11).

$$y = \left\{ x[n+m-1:m-k], \overline{x[m-k-1]|x[m-k-2]| \ldots |x[0]} \right\} \quad (9)$$

$$p = z[n+k:k+1] + c \quad (10)$$

$$c = (\sim z[n+k] \& z[k])|(z[n+k] \& z[k] \& (z[k-1]|z[k-2]| \ldots |z[0])) \quad (11)$$

$$c = (\sim z[n+k] \& z[k] \& (z[n+k-1:k+1]! = \{1,1,\ldots,1\}))|(z[n+k] \& z[k] \& (z[k-1]|z[k-2]| \ldots |z[0])) \quad (12)$$

As described above, the output from the rounding postprocessor 104 in the arithmetic circuit 400 is the same as that in the arithmetic circuit 100. Therefore, an overflow processor 305 (FIG. 3) can be installed after the rounding postprocessor 104 in the arithmetic circuit 400 shown in FIG. 4 as well. An explanation when the overflow processor 305 is installed after the rounding postprocessor 104 in the arithmetic circuit 400 is the same as that for the arithmetic circuit 300 shown in FIG. 3, so this explanation will be omitted.

The arithmetic circuit according to each embodiment explained above includes the rounding preprocessor 102 that operates in parallel with the arithmetic unit 101 and compresses the number of bits of output data from the arithmetic unit 101. This makes it possible to reduce the number of bits of the register 103 while maintaining a high-speed operation.

Next, the arithmetic unit 101 and rounding preprocessor 102 included in each of the arithmetic circuits 100, 300, and 400 explained with reference to FIGS. 1 to 4 will be explained in detail. At least a part of the processing of the rounding preprocessor 102 is performed in parallel with a part of the calculation process of the arithmetic unit 101. Therefore, an increase in processing delay caused by the addition of the processing (more specifically, the calculation of y[0] indicated by equation (1) or (9)) of the rounding preprocessor 102 can be minimized or eliminated.

Figure 5:
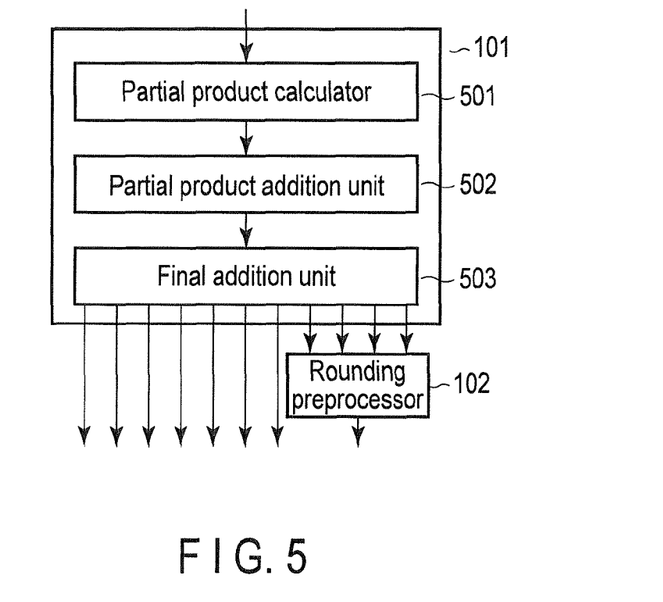
FIG. 5 is a block diagram schematically showing a configuration example of an arithmetic unit and rounding preprocessor shown in FIG. 1.

FIG. 5 shows the arithmetic unit 101 and rounding preprocessor 102 shown in FIG. 1 in more detail. The arithmetic unit 101 includes a partial product calculator 501, partial product addition unit 502, and final addition unit 503. As described above, at least a part of the processing of the rounding preprocessor 102 is performed in parallel with a part of the processing of the arithmetic unit 101. Therefore, these processes will collectively be explained below.

The arithmetic unit 101 of the embodiment performs addition (or subtraction), multiplication, and an arithmetic operation combining them. As an example, an arithmetic operation combining multiplication and addition as indicated by equation (13) below will be explained:

$$X = A \times B + C \qquad (13)$$

In this example, assuming that each of A, B, and C is a 4-bit signed numerical value encoded by two's complement, and X is an 8-bit signed numerical value encoded by two's complement. A, B, C, and X are represented by A=a[3:0], B=b[3:0], C=c[3:0], and X=x[7:0].

Figure 6:
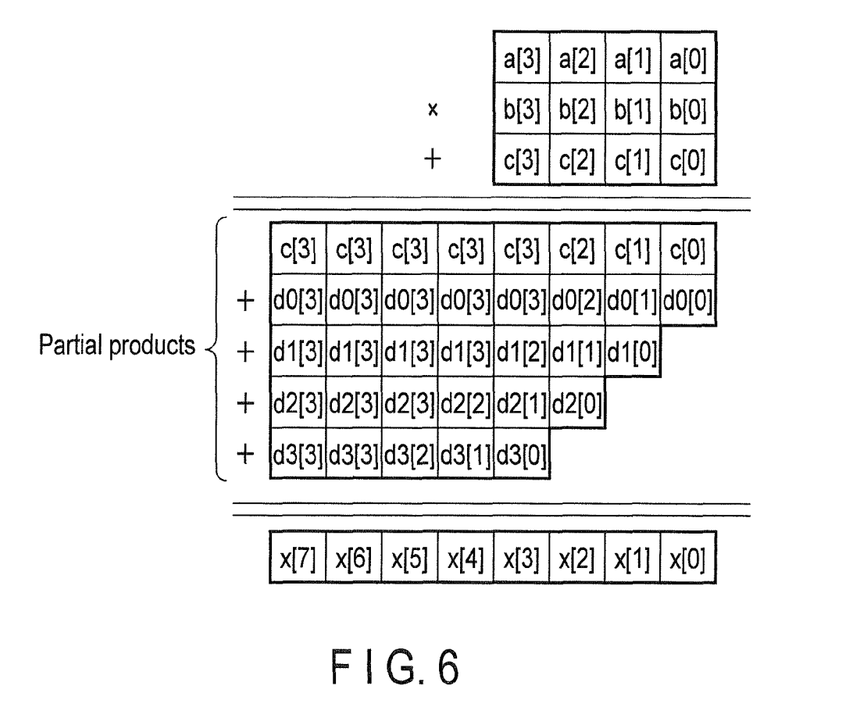
FIG. 6 is a view for explaining an example of the operation of a partial product calculator shown in FIG. 5.

FIG. 6 shows examples of partial products calculated by the partial product calculator 501. As shown in FIG. 6, calculations in which multiplication and addition are all decomposed into additions are called partial products. In this example, the partial product calculator 501 generates five (five rows of) partial products. Referring to FIG. 6, di[n]=a[i]&b[n] where i=0, 1, 2, and 3. In the example shown in FIG. 6, the MSB (i.e., the sign bit) is extended because this is a signed arithmetic operation.

Figure 7:
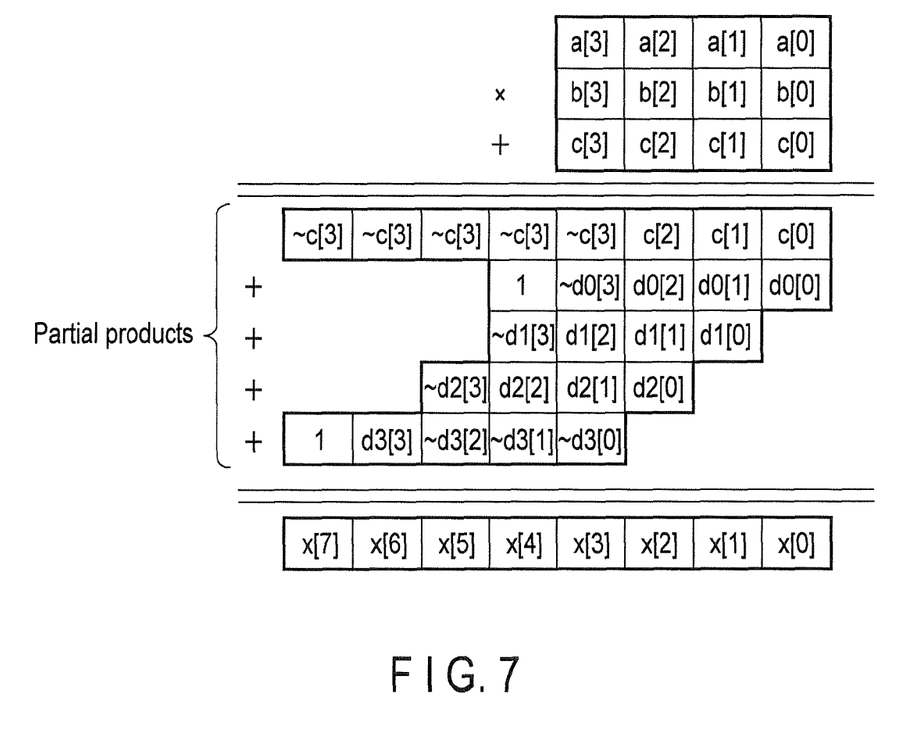
FIG. 7 is a view for explaining another example of the operation of the partial product calculator shown in FIG. 5.

FIG. 7 shows other examples of partial products calculated by the partial product calculator 501. In the examples shown in FIG. 7, partial products of a signed arithmetic operation are realized by a method of, e.g., inverting some bits or adding 1 as an upper bit of the MSB, instead of bit extension, in a multiplication part.

Figure 8:
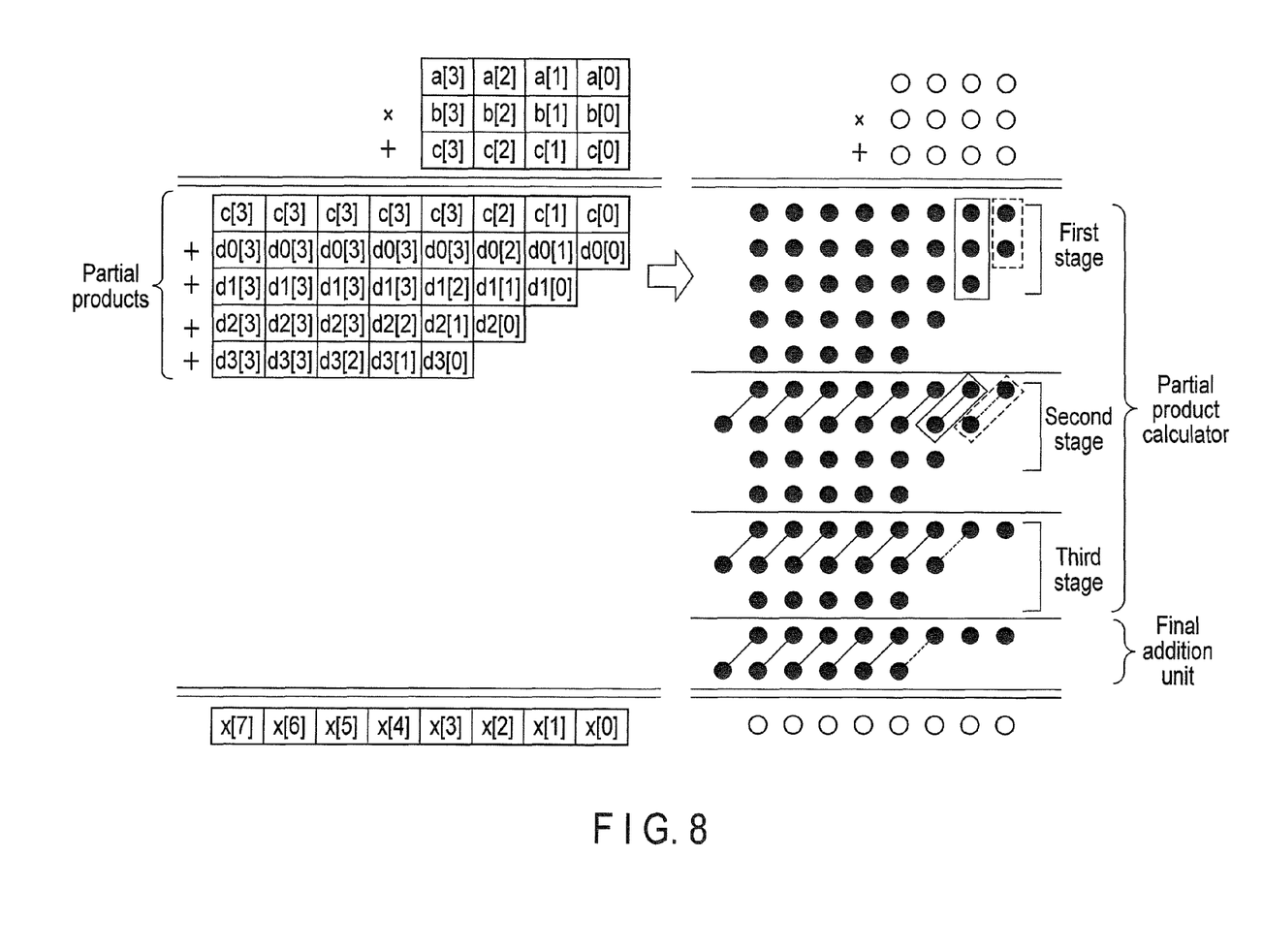
FIG. 8 is a view for explaining further example of the operation of the partial product addition unit shown in FIG. 5.

FIG. 8 shows an example of a method by which the partial product addition unit 502 adds the partial products shown in FIG. 6. Referring to FIG. 8, each of open circles and filled circles represents a 1-bit numerical value in a corresponding position. The partial product addition unit 502 repeats a stage of converting three rows of partial products into two rows of partial products by using a full adder (FA) and half adder (HA), thereby finally obtaining two rows of partial products. In the example shown in FIG. 8, the partial product addition unit 502 reduces five rows of partial products to four rows of partial products in the first stage, reduces the four rows of partial products to three rows of partial products in the second stage, and reduces the three rows of partial products to two rows of partial products in the third stage.

Figure 9:
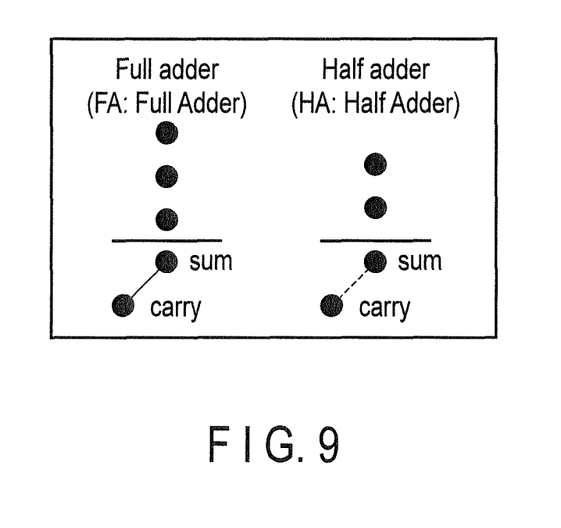
FIG. 9 is a view for explaining a full adder and half adder.

FIG. 9 schematically shows the operations of the full adder and half adder. As shown in FIG. 9, the full adder can express a 3-bit addition result by two bits, i.e., a carry bit (carry) and sum bit (sum), and the half adder can express a 2-bit addition result by two bits, i.e., a carry bit (carry) and sum bit (sum). In FIG. 8, for example, the full adder converts three bits in the same digit enclosed with solid lines shown in the first stage into two bits enclosed with solid lines shown in the second stage. The half adder converts two bits in the same digit enclosed with dotted lines shown in the first stage into two bits enclosed with dotted lines shown in the second stage. In each stage, the partial product addition unit 502 converts three rows of partial products into two rows of partial products by using the full adder and half adder. This calculation can be realized by using a Wallace tree.

Letting L(n) be the number of partial products (the number of rows) in the nth stage in the Wallace tree, a number L(n+1) of partial products in the (n+1)th stage has a value as indicated by:

$$L(n+1) = 2\mathrm{floor}(L(n)/3) + \mathrm{mod}(L(n), 3) \qquad (14)$$

$$= \mathrm{ceil}(2L(n)/3)$$

where floor(x) represents a maximum integral value equal to or smaller than x, ceil(x) represents a minimum integral value equal to or larger than x, and mod(a,b) represents a remainder when a is divided by b. That is, in the Wallace tree, three rows of partial products are converted into two rows, and surplus partial products equal to or less than two rows remain. This processing is repeated until two rows of partial products are finally obtained. The final adder unit 503 adds the final two rows of partial products. In parallel with this processing, the rounding preprocessor 102 starts an OR operation immediately after the value of the LSB of the output x is determined.

Figure 10:
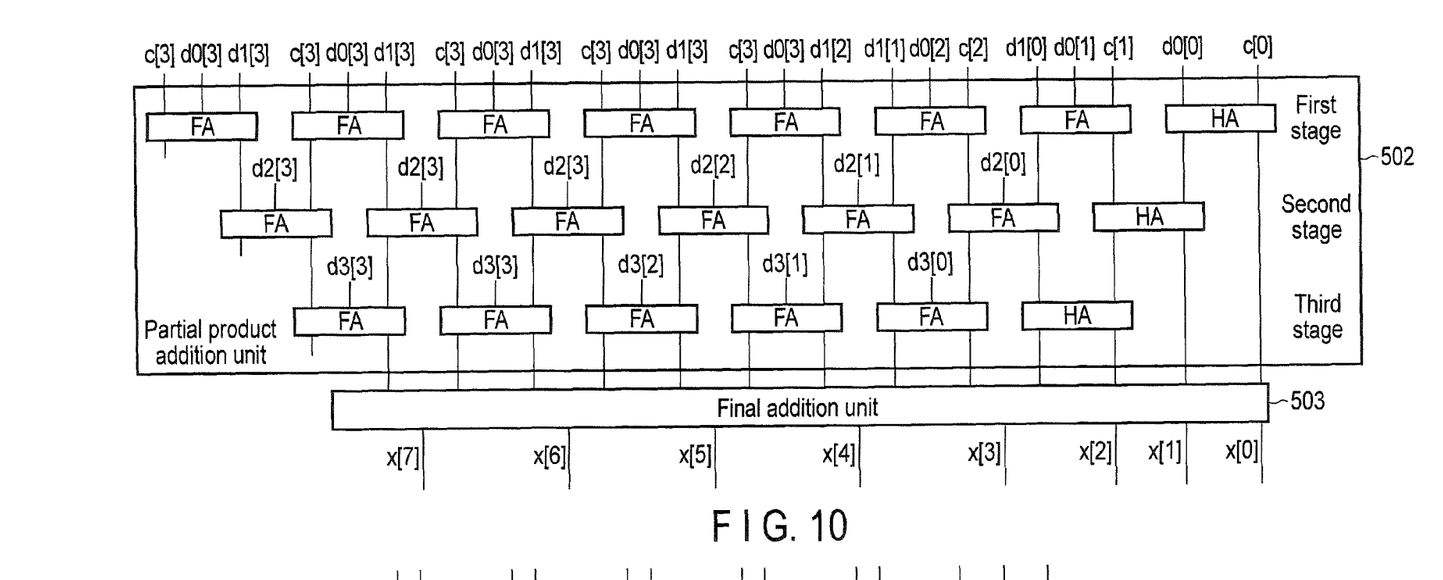
FIG. 10 is a block diagram showing an example of the partial product addition unit shown in FIG. 5.

FIG. 10 shows the partial product addition unit 502 complying with the Wallace tree in detail. FIG. 10 is obtained by converting FIG. 8 into the Wallace tree. Referring to FIG. 10, FA denotes a full adder, and HA denotes a half adder. Note that lower three bits x[2:0] of the output x from the arithmetic unit 101 are not processed by the final addition unit 503, and are determined in the partial product addition unit 502. FIGS. 8 and 10 reveal that the values of the lower three bits x[2:0] of the output x from the arithmetic unit 101 are determined before the processing of the final addition unit 503. FIGS. 8 and 10 show in more detail that the values of the lower three bits are calculated in the order of x[0], x[1], and x[2]. More specifically, x[0] is determined in the first stage, x[1] is determined in the second stage, and x[2] is determined in the third stage. As in this example, in a calculation using the Wallace tree, a processing delay required for the calculation is often smaller on the LSB side up to a given bit position. One reason for this is that the number of rows for which the sum of partial products is to be calculated in multiplication is generally smaller on the LSB side. This is one reason why the processing delay of the rounding preprocessor 102 can be made smaller than the whole processing delay of the arithmetic unit 101.

Figure 11:
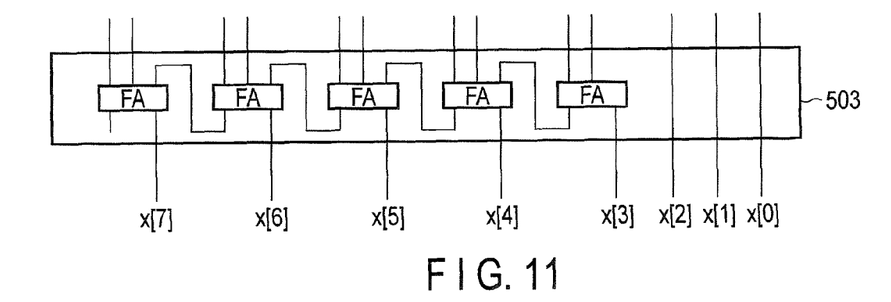
FIG. 11 is a block diagram showing an example of a final addition unit shown in FIG. 5.

FIG. 11 shows a configuration example of the final addition unit 503. In this example shown in FIG. 11, the final addition unit 503 is a ripple carry adder (RCA), and includes four full adders and one half adder. The final addition unit 503 is an adder for two numerical values. Unlike an addition process performed by complete parallel processing in stages such as in the partial product addition unit 502, an adder in which essentially carry bits propagate regardless of an implementation method is necessary. This means that the addition value can be calculated with a small processing delay on the LSB side. Even when the final addition unit 503 is implemented by a carry look ahead adder, a processing delay necessary for a calculation increases for upper carry bits.

Figure 12:
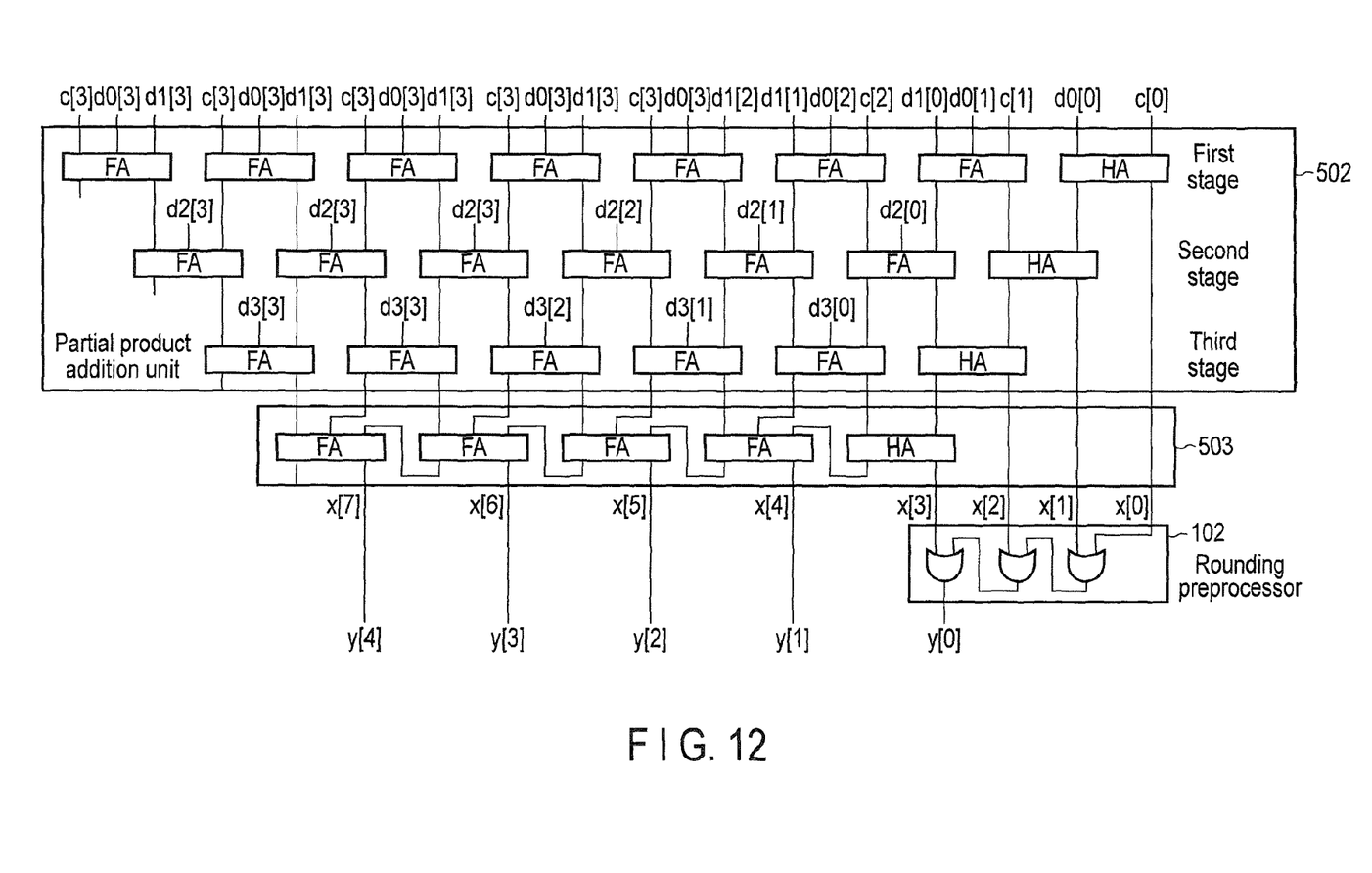
FIG. 12 is a block diagram showing an arithmetic unit combining the partial product addition unit shown in FIG. 10 and the final addition unit shown in FIG. 11.

FIG. 12 schematically shows the arithmetic unit 101 and rounding preprocessor 102 combining FIGS. 10 and 11. Referring to FIG. 12, the number of bits for which the rounding preprocessor 102 performs an OR operation is 4. As shown in FIG. 12, lower four bits of the output x from the arithmetic unit 101 are supplied to the rounding preprocessor 102. The rounding preprocessor 102 includes three OR circuits (or OR gates), and generates a 1-bit calculation value by performing an OR operation on the lower four bits of the output x from the arithmetic unit 101. The upper four bits of the output x from the arithmetic unit 101 can directly be supplied to the register 103 (not shown in FIG. 12) without passing them through the rounding preprocessor 102. The register 103 holds a 5-bit value y as an intermediate value obtained by concatenating the upper four bits of the output x from the arithmetic unit 101 and the calculation value generated by the rounding preprocessor 102.

As is apparent from the example shown in FIG. 12, the processing delay required for the rounding preprocessor 102 to calculate y[0] is smaller than that required for the arithmetic unit 101 to calculate the whole of y[4:1]. That is, the processing delay of the arithmetic processing itself of the arithmetic unit 101 does not increase even when the rounding preprocessor 102 is added.

For example, when a ripple carry adder is applied to the final addition unit 503, values are always determined from the LSB side. Therefore, even when the rounding preprocessor 102 sequentially performs OR operations from the LSB side, the processing delay of the carry calculations of the full adder is larger than that of the OR operations. Consequently, the rounding preprocessor 102 can complete the calculations before the final addition unit 503 completes the addition process.

Figure 13:
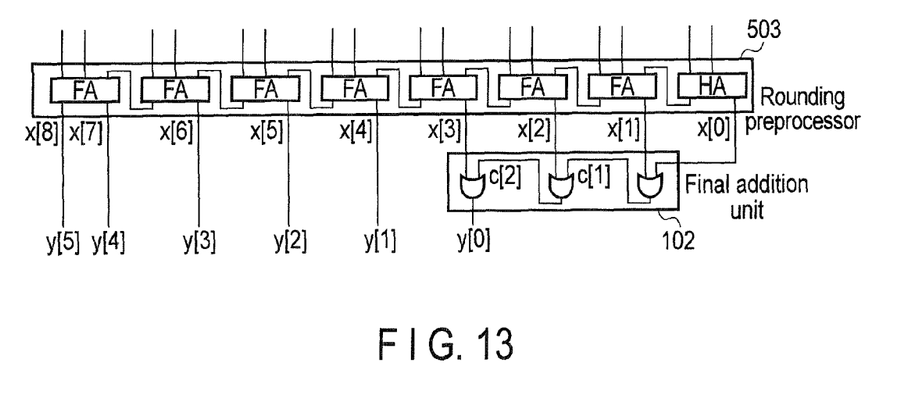
FIG. 13 is a block diagram showing a configuration example of a final addition unit corresponding to a ripple carry adder and a rounding preprocessor.

FIG. 13 shows a configuration example of the final addition unit 503 corresponding to a ripple carry adder and the rounding preprocessor 102. Referring to FIG. 13, even when assuming that all inputs are simultaneously supplied to the final addition unit 503, the processing of the rounding preprocessor 102 is completed before the processing of the arithmetic unit 101 is completed. This will be explained below. Assume that two bits input to OR circuits of the rounding preprocessor 102 are x[n] and c[n−1]. FIG. 13 shows that processes necessary to calculate c[n−1] are the calculation of x[n−1] and an OR operation. Also, processes necessary to calculate x[n] are the calculation of x[n−1] and a calculation by a full adder. Since the processing delay of the OR operation is smaller than that of the full adder, a processing delay for calculating c[n−1] is smaller than that for calculating x[n]. This means that y[0] is always calculated with a processing delay smaller than that for calculating y[1] with respect to a given bit width. Thus, even when there is no processing delay difference in the partial product addition unit 502, the processing of the rounding preprocessor 102 can be completed before the processing of the arithmetic unit 101 is completed.

Figure 14:
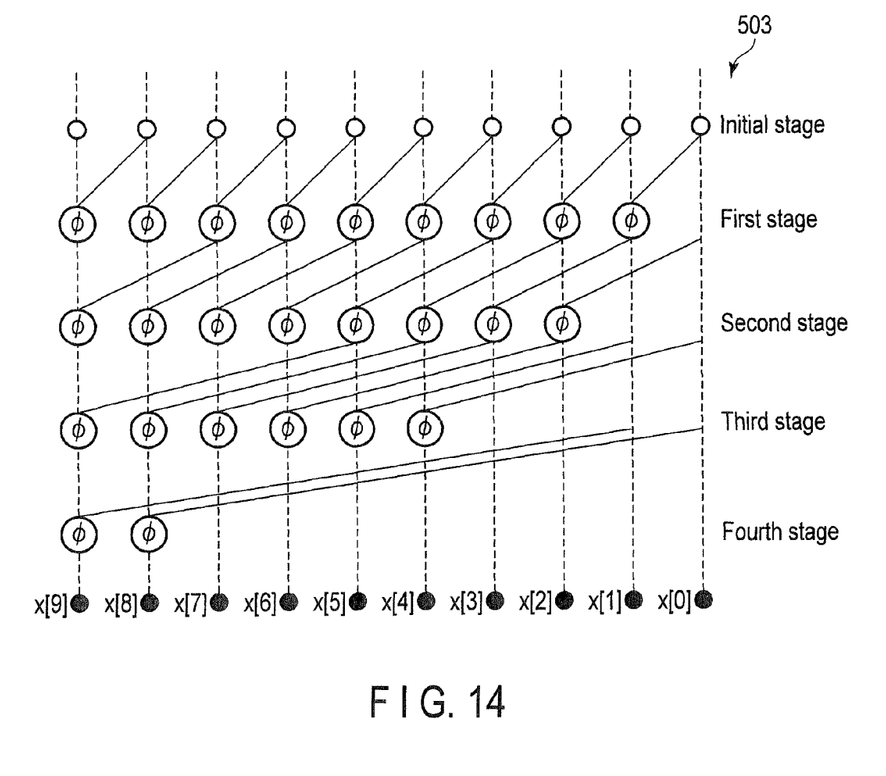
FIG. 14 is a block diagram showing another example of the final addition unit shown in FIG. 5.

FIG. 14 shows another configuration example of the final addition unit 503. In this example shown in FIG. 14, the final addition unit 503 is a Kogge-Stone adder (KSA) that is one type of carry look ahead adder and one of fastest adders. FIG. 14 shows an example of a 10-bit addition process. In an n-bit addition process, the KSA calculates n-bit $G^{(t)}$ and n-bit $P^{(t)}$ required to calculate a carry bit in each stage. When adding a and b, the KSA calculates values $G^{(0)}$ and $P^{(0)}$ in the initial stage as indicated by equations (15) below. This corresponds to operations indicated by open circles in FIG. 14.

$$G^{(0)}[k]=a[k]|b[k]$$

$$P^{(0)}[k]=a[k]\& b[k] \qquad (15)$$

Carry operators φ in the (t)th stage perform calculations indicated by equations (16) and (17) below from the values in the (t−1)th stage:

$$G^{(t)}[k] = \begin{cases} G^{(t-1)}[k] | (G^{(t-1)}[k-t] \& P^{(t-1)}[k]) & (k \geq t) \\ G^{(t-1)}[k] & (k < t) \end{cases} \qquad (16)$$

$$P^{(t)}[k] = \begin{cases} P^{(t-1)}[k] \& P^{(t-1)}[k-t] & (k \geq t) \\ P^{(t-1)}[k] & (k < t) \end{cases} \qquad (17)$$

A number T of necessary calculation stages is T=ceil(log 2 (g)) for a g-bit adder.

From $G^{(T)}$ and $P^{(T)}$ after the final stage, an addition value x[n:0] of a and b can be calculated as indicated by:

$$x[k] = \begin{cases} G^{(T)}[n-1] & (k = n) \\ G^{(T)}[k-1] | P^{(0)}[k] & (0 < k < n) \\ P^{(0)}[0] & (k = 0) \end{cases} \qquad (18)$$

The operation and processing delay of the rounding preprocessor 102 when the final addition unit 503 is the KSA will be explained below. When the number of bits is doubled, the number of stages necessary to calculate a carry bit increases by 1 in the KSA. The processing delay can be decreased by implementing the rounding preprocessor 102 by taking account of this feature.

Figure 15:
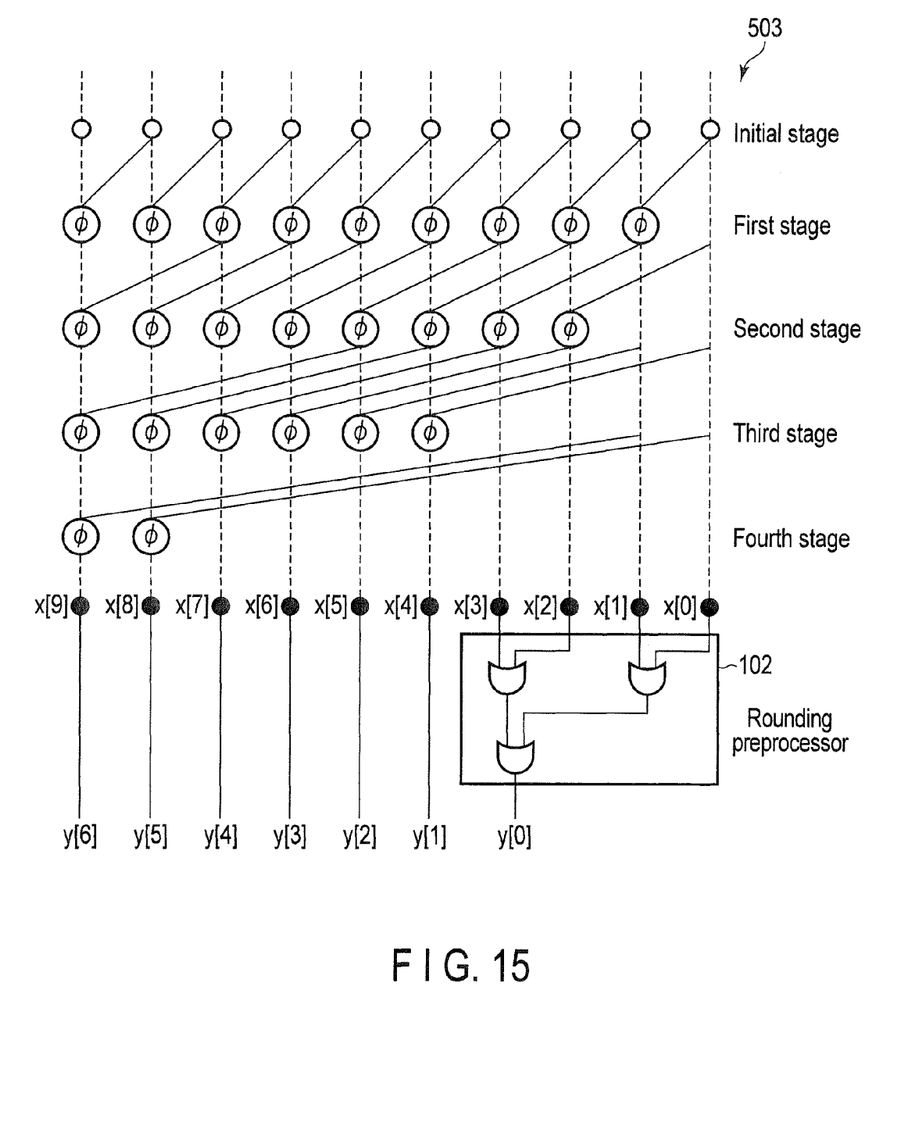
FIG. 15 is a block diagram showing a configuration example of a final addition unit corresponding to a Kogge-Stone adder and a rounding preprocessor.

FIG. 15 shows a configuration example of the final addition unit 503 corresponding to a Kogge-Stone adder and the rounding preprocessor 102. In this example shown in FIG. 15, the rounding preprocessor 102 performs an OR operation on the lower four bits of the output x from the final addition unit 503. When realizing the OR operation by a binary tree structure, a processing delay required for a rounding preprocessing is equivalent to a delay of ceil(log 2 (h)) OR processes in an h-bit OR operation. In the example shown in FIG. 15, ceil(log 2 (4))=2. As indicated by equation (16), the calculation of a carry operator requires AND processing and OR processing. If the AND processing and OR processing have the same delay, the carry operator processing is equivalent to two OR processing delays.

Assume that the bit width of the KSA is g, and the rounding preprocessor 102 performs an OR operation on lower h bits of the output x. In this case, if the total processing delay of h-bit carry operator processing and h-bit rounding preprocessing is smaller than the delay of g-bit carry operator processing, no extra delay occurs in the addition calculation itself even when the rounding preprocessing is added. A condition for this can be represented by the following inequality (19), i.e., inequality (20):

$$2ceil(\log 2(g)) \geq 2ceil(\log 2(h)) + ceil(\log 2(h)) \qquad (19)$$

$$ceil(\log 2(g)) \geq 1.5ceil(\log 2(h)) \qquad (20)$$

In the example shown in FIG. 15, the left and right sides of inequality (20) are respectively 4 and 3, so inequality (20) is satisfied. Accordingly, the addition of the rounding preprocessor 102 causes no delay compared to the processing of the arithmetic unit 101 alone. In practice, inequality (20) is not an absolute condition because it depends on the difference between the processing delays of individual bits of the partial product addition unit 502, and the implementation of AND or OR. However, inequality (20) can be used as a criterion for designing when using a high-speed carry look ahead adder.

As described above, a part or the whole of the processing of the rounding preprocessor 102 is performed in parallel with a part of the calculation process of the arithmetic unit 101. Therefore, it is possible to minimize or eliminate the increase in processing delay caused by the addition of the processing of the rounding preprocessor 102.

The arithmetic circuit according to at least one of the embodiments explained above includes the rounding preprocessor 102 that operates in parallel with the arithmetic unit 101 and compresses the number of bits of output data from the arithmetic unit 101. This makes it possible to reduce the number of bits of the register 103 while maintaining a high-speed operation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An arithmetic circuit comprising:

an arithmetic unit configured to perform processing comprising an arithmetic operation including addition and multiplication to generate a first value of (n+m) bits, where n is an integer of not less than 1 and m is an integer of not less than 2;

a rounding preprocessor configured to perform processing comprising compressing lower (m−1) bits of the first value generated by the arithmetic unit by performing an OR operation on the lower (m−1) bits of the first value to generate a second value of 1 bit;

a register which stores a third value of (n+2) bits obtained by concatenating upper (n+1) bits of the first value and the second value; and a rounding postprocessor configured to determine an addition value of 2 bit based on a most significant bit of the third value, add the addition value to the third value to generate a fourth value, and remove lower two bits of the fourth value, wherein at least a part of the processing of the rounding preprocessor is performed in parallel with a part of the processing of the arithmetic unit.

* * * * *